310-10 SR
F213A XR 3,336,489

666

Aug. 15, 1967 J. VOLGER 3,336,489
DEVICE FOR PRODUCING A CURRENT
Filed Oct. 3, 1963

Superconductive circuit

INVENTOR
JAN VOLGER
BY
Frank R. Jufani
AGENT 3,336,489
DEVICE FOR PRODUCING A CURRENT
Jan Volger, Emmasingel, Eindhoven, Netherlands, assignor to North American Philips Company, Inc., New York, N.Y., a corporation of Delaware
Filed Oct. 3, 1963, Ser. No. 313,666
18 Claims. (Cl. 310—40)

Figures 1, 2, 3:
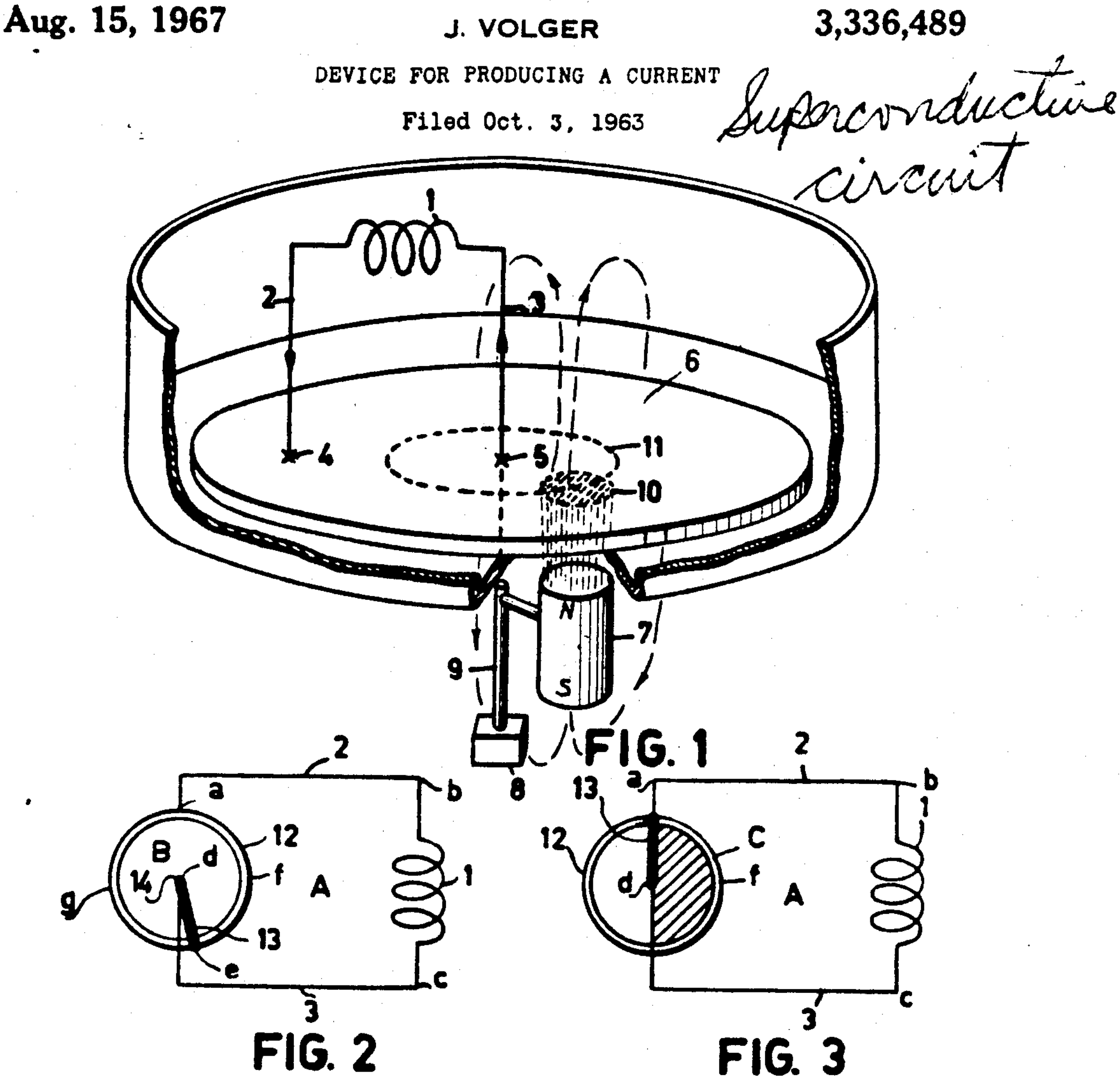

This invention relates to a device for producing a persistent current in a superconductive circuit.

For producing very strong magnetic fields, for example of the order of magnitude of 100,000 gauss, ferromagnetic materials, such as, for example, iron, cannot successfully be used since they become saturated magnetically at comparatively low values. The production of strong magnetic fields by means of an electromagnet encounters the difficulty that when using normal conductors, for example, copper, the heat development becomes inadmissibly large for many practical uses. It has therefore been suggested to use the property of so-called superconducting materials, such as lead and tin, that they show an infinitely large conductivity below a very critical temperature, so that a current will not produce any heat therein. However, these materials have the property that even below the critical temperature they may become "normally" conductive again, that is to say they will assume a finite conductivity under the influence of a magnetic field, the strength of which is larger than a given critical value. In order to prevent the conductors of an electromagnet from becoming normally conductive as a result of the produced field, a superconducting material should be chosen which is magnetically hard, that is to say shows a high critical magnetic field strength, such as, for example, $Nb_3$-Sn and Nb-Zr.

In principle, the current for the electromagnet may be supplied from outside the cooling chamber. However, the drawback here is that on the one hand a source should be provided which continuously supplies current, whereas on the other hand heat is supplied to the cooling chamber by conduction through the current supply wires.

In order to mitigate this drawback it has already been proposed to use persistent currents, that is to say, the condition that a current in a closed circuit of superconductive material does not decrease in strength since a superconductor exhibits zero resistance, while a magnetic flux enclosed by a loop of superconductive material can in principle not vary. A method is already known for producing such a persistent current by means of pistons movable in apertures in a superconductive body and of conductive gates which can be controlled by means of locally produced temperature variations. This method has the drawback that inside the cooling chamber movable parts have to be provided which again have to be controlled from outside the chamber and that for controlling the gates heat has to be supplied.

The invention provides a simple solution to the problem of generating a persistent current in a closed loop of superconductive material.

According to the invention, in the device for producing a persistent current in a superconductive circuit the current conductors are connected to two different points of a plate of superconductive material and means are provided for causing a region of normally conducting material where a magnetic flux passes through the plate to move repeatedly between the two junction points on the plate in a manner such that a superconductive connection continuously exists between the two points via the plate, the flux, during the movement in a given direction, always having the same polarity and, during a possible movement in the opposite direction, having the opposite polarity.

The invention uses some known properties of superconductive materials.

For example, a magnetic field cannot penetrate into a superconductive material so long as it is in a superconductive condition, with the exception of an extremely thin layer on the surface. A magnetic field can only be present in places where the superconductive material is "normally" conductive. So this may be a point where the magnetic field strength is equal to or larger than the critical value of magnetic flux density for the particular superconductive material in use. As already noted above, the magnetic flux in a region enclosed by superconductive material cannot vary because a virtual variation of the flux produces an E.M.F., as a result of which a current is formed which counteracts the variation, which variation is complete because the resistance equals zero. So once a magnetic flux in a normally conductive region is trapped in a superconductive field, the value of the flux can no longer vary. However, the normally conducting field may be displaced or change its form and the total amount of trapped flux will not vary. In general, a magnetic flux cannot be formed at any point in a superconductive body for example, by merely introducing a magnet into the vicinity of the superconductive body. However, if a small area in a superconducting field is raised above the critical temperature or critical magnetic field of the superconductive material, a "hole" or "normally" conducting region is created in the body. Such a "normally" conducting field through which a magnetic flux passes is sometimes called a "Meissner" area. Another method for producing a Meissner spot or "hole" in a superconductive body is described in a copending U.S. application, Ser. No. 296,587, filed July 22, 1963 now Patent No. 3,238,514. As discussed therein, a Meissner spot can be created by introducing a magnetic field through the edge of the superconductive body. The magnetic flux can be maintained wholly or partially by an electric current which encloses in a narrow current path the normally conducting area 10, or it may be produced by the field of an external magnet, or by a combination of the electric current and the magnet field. A Meissner-area can be displaced by means of a magnet, or in accordance with an earlier proposal set forth in said copending U.S. application, by means of a light beam which is displaced over the surface of the superconductive body.

In order that the invention may readily be carried into effect, an embodiment thereof will now be described more fully, by way of example, with reference to the accompanying drawing.

Figure 4:
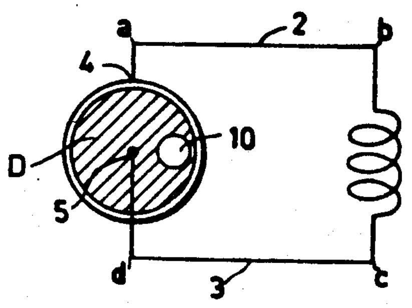
Figure 5:
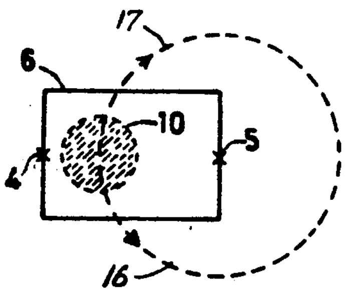

FIGURE 1 diagrammatically shows a preferred embodiment of the invention,

FIGS. 2–4 are schematic diagrams useful in explaining the operation of the invention, and FIG. 5 illustrates another mode of operation of the invention.

In this embodiment, the solenoid 1, by means of which a strong magnetic field is to be produced, is connected through the current conductors 2 and 3 to the points 4 and 5 on the plate 6. These various parts consist of superconductive material, namely, the solenoid 1 and the conductors 2 and 3 preferably consist of a magnetically hard superconductive material, e.g. niobium-tin ($Nb_3$-Sn) or niobium-zirconium (Nb-Zr), that is to say, a material having a high critical magnetic field strength, while the plate 6 may consist, for example, of lead or tin, the critical field strength of which is lower. These conductors are contained in a cooling vessel not shown in which the temperature can be decreased below the critical temperature of the various parts by means which are not shown. At the lower side of the plate 6 a magnet 7 is provided which can be turned about a shaft 9, for example by means of a motor 8, or manually. Preferably, the magnet 7 together with the driving parts 8, 9 is mounted outside the cooling vessel, a wall of which has then to be thought between the magnet 7 and the plate 6. In the normally conducting condition of the plate 6, the lines of force of the magnet 7 will penetrate through the plate 6.

If the cooling vessel is now cooled below the critical temperature of the conductors and of the plate 6, a Meissner area 10 is formed in the plate 6 above the magnet 7. As a result the area 10 of the plate 6 remains normally conductive and as a result lines of force of the magnet still penetrate through the plate 6. However, in other portions of the plate 6 a magnetic field no longer exists.

If the magnet 7 is turned about the shaft 9, the Meissner area 10 will describe a circular path 11 about the junction point 5. As the magnet rotates under the coil 1, the lines of flux passing through the "hole" 10 cut the coil 1 and induce an E.M.F. therein as a result of which a persisting current is produced in the closed superconductive loop formed by the current conductor 2, the coil 1, the current conductor 3 and the plate 6. If we stop the magnet after it makes one complete revolution in the direction indicated by the arrow heads on path 11, the persistent current continues to flow in the direction indicated by the arrow heads on conductors 3 and 2 since the superconductive loop has zero resistance. If we assume the coil 1 is wound in a counter-clockwise direction looking from conductor 3 towards conductor 2, then the current flow therein will produce a north pole at the right hand end of the coil and a south pole at the left hand end. Each time the magnet is rotated about the path 11 and E.M.F. is induced in coil 1 which causes an additional increment of persistent current to flow in the superconductive loop. This current becomes stronger according as the magnet makes more turns and will then remain constant if the magnet is stopped, or will decrease if the magnet is moved in the opposite direction. In this manner the current can be adjusted to any desired value provided the self induced field produced thereby does not exceed the critical field of the superconductive material.

The operation of this device may be compared with that of a homopolar generator, as shown diagrammatically in FIGURE 2.

This device comprises a closed ring 12 which encloses a magnetic flux. Inside the ring 12 a spoke 13 can turn about the shaft 14 in a manner such that the end of the spoke is always in a conductive connection with the ring 12 through a sliding contact. The current conductors 2 and 3, to which the solenoid 1 is connected, are connected to a point of the ring 12 and to the shaft 14. If the spoke 13 is turned about the shaft 14, an induction voltage will be produced in the spoke. This induction voltage is operative between the shaft 14 and the ring 12, so also between the ends of the conductors 2 and 3, as a result of which a current will tend to flow.

In the known homopolar generators a conductor is moved mechanically in a magnetic field, as a result of which an induction voltage is formed as a result of the fact that the electrodes in the conductor are subjected to a Lorentz force. In the device according to the invention no mechanically moved conductors are available and consequently a Lorentz force cannot be demonstrated immediately.

The operation of the device according to the invention is as follows. Let it be assumed that in the device shown in FIGURE 2 the various parts consist of superconductive material and that originally no current is flowing in the conductors 2 and 3. Therefore, there is no magnetic flux in the area A enclosed by it. Let us further assume that magnetic flux exists in the area B enclosed by the ring 12, which flux is maintained by a persisting current in the ring 12, the spoke 13 being in the position shown.

As already noted above, inside a closed contour of superconductive material the magnetic flux cannot vary. The contour *abcdefa* encloses no magnetic flux. If the spoke 13 is moved counterclockwise to the position shown in FIGURE 3, this contour continuously passes into the contour *abcda* and consequently, the total magnetic flux in the latter will have to be zero. However, this contour encloses the shaded area C of the flux which passes through the ring 12. Since the total flux is zero, the area A must consequently enclose an equal and opposite flux which is formed by a current in the conductors 2 and 3. If the spoke is further moved until the position shown in FIGURE 2 is reached again, the contour has continuously passed into *abcdega*. Since the total flux must have remained zero and the last contour now encloses the total flux which passes through the ring 12, a flux must be available in the area A which is equal and opposite to the flux through the ring 12. In this manner it may also be seen that with every following turn of the spoke 13 the flux in the area A increases by an amount equal to the flux through the ring 12 and that consequently also the current through the external circuit has to increase correspondingly through the conductors 2 and 3 and the coil 1.

This latter explanation is not restricted to the fact that a conductor is moved in a magnetic field, but is based on the principle that a superconductive contour continuously varies in shape so as to maintain the enclosed magnetic flux constant. This reasoning holds good also if the "spoke" 13 would have a different shape, for example that of the shaded area D in FIGURE 4, which in principle comes to it, that in fact the normally conducting area 10 through which a magnetic flux passes, turns about the junction point 5 as was the case in the device shown in FIGURE 1. It is clear that in this case also the formation of a current in the external circuit is a result of the presence of the E.M.F. so that in principle the external circuit may also contain a certain resistance.

With reference to the device shown in FIGURE 1, it should be noted that it is not necessary that the Meissner area 10 as such continuously exist in the disc 6 during the travel of the magnet 7 along the circle 11 and around the point 5. It may possibly also leave the plate 6 through the edge, as a result of which it is, in fact destroyed. It is formed again when the magnet is further turned to enter the plate 6 through an edge of the plate as diagrammatically shown in FIGURE 5. However, it is necessary that the Meissner area does not touch the junction points 4 and 5, nor should it be wider than the plate 6 since otherwise a superconductive connection through the plate 6 between the points 4 and 5 would not exist continuously and the above superconductive contour would be interrupted.

It is also clear that the path described by the Meissner area need not be a circle and that the same current also will be produced if the Meissner area 10 would turn about the point 4 in an opposite direction instead of about the point 5 or, with opposite polarity of the flux, in an opposite direction about the point 4.

In the construction shown in FIGURE 5, the magnet may be caused to oscillate, for example, between the points 16 and 17 on the path 11. As a result, the Meissner area 10 will describe a reciprocating movement between these points and will cross the line joining the junction points 4 and 5. In this case, the polarity of the magnetic flux should be reversed with each reversal of the direction of movement in order to build up a persistent current of large magnitude. This may be effected by using an electromagnet and reversing the polarity of the energizing voltage at points 16 and 17.

An advantage of the device according to the invention is that the area across which the persisting current closes through the plate 6 can be large, and consequently the current density is low, so that a large current can exist before the material threatens to become normally conducting under the influence of the magnetic field produced by this current.

What is claimed is:

1. A superconductor device for producing a persistent current in a superconductive circuit comprising; a plate of superconductive material, a path of superconductive material having two ends joined to said plate at spaced-apart points thereon to form first and second junction points, magnetic field producing means for producing a spot of normal conductivity in said plate wherein a magnetic flux passes through the plate, means for moving said spot past the line in said plate defined by said junction points such that a superconductive path continuously exists in the plate joining said junction points during the movement of said spot.

2. A device as described in claim 1, wherein said superconductive path comprises a loop of hard superconductive material extending out of the plane of said plate.

3. A device as described in claim 1, wherein said means for moving the spot comprises a movable magnet positioned near said plate.

4. A device as described in claim 3, wherein said means for moving is arranged to rotate said magnet so as to move said spot in a closed path around one of said junction points.

5. A devices as described in claim 3, wherein said superconductive path includes an inductance composed of a hard superconductive material.

6. A device as described in claim 5, wherein said plate is composed of a soft superconductive material.

7. A superconductor device for producing a persistent current in a superconductive circuit comprising, a plate of superconductive material, a coil composed of a superconductive material having two ends connected to said plate at spaced-apart points thereon to form first and second junction points which define a line in said plate, means for producing an area of normal conductivity in said plate wherein a magnetic flux passes through the plate, and means for moving said area of normal conductivity repeatedly across the line defined by said first and second junction points of the plate so that a superconductive path continuously exists in the plate joining said junction points, said magnetic flux always having a given polarity during the movement in a given direction and having the opposite polarity during any movement in the opposite direction.

8. A superconductor device for producing a persistent current in a superconductive circuit comprising, a plate of superconductive material, a path of superconductive material extending out of said plate and having two ends joined to said plate at spaced-apart points thereon to form first and second junction points, means for producing a spot of normal conductivity in said plate wherein a magnetic flux passes through the plate, and means for oscillating said spot back and forth across the line in said plate defined by said junction points such that a superconductive path continuously exists in the plate connecting said junction points during the movement of said spot.

9. A device as described in claim 8, wherein said spot producing means further comprises means for reversing the polarity of said magnetic flux in synchronism with the oscillation of said spot so as to provide a cumulative build-up of said persistent current in said superconductive path.

10. A device as described in claim 3 further comprising a housing inside of which said superconductive plate and said superconductive path are positioned and wherein said magnet is positioned outside of said housing, the inside of said housing being maintained at a superconductive temperature.

11. A superconductive current generator comprising a closed loop of superconductive material having a hole therein, said closed loop including a superconductive plate, means for producing a spot of normal conductivity in said plate wherein a magnetic flux passes through the plate, and means for moving said spot along a given path including a portion of said plate such that said flux is swept across said hole, said given path being chosen so that a continuous superconductive path exists in said closed loop for all positions of said spot in said given path, whereby a persistent current is produced in said closed superconductive loop.

12. Apparatus for producing a persistent circulating current in a closed superconductive circuit comprising, a plate of superconductive material, a wire composed of superconductive material electrically connected to said plate, said plate and wire forming part of said superconductive circuit, magnetic field producing means for producing a spot of normal conductivity in said plate wherein lines of magnetic flux pass through the plate, and means for moving said spot across said plate so that said lines of flux sweep past said superconductive wire thereby producing a persistent current in said plate and wire, the movement of said spot being controlled so that a continuous superconductive path exists in said closed superconductive circuit for all positions of the spot in the plate.

13. A superconductive device comprising a closed loop of superconductive material arranged to encircle a non-superconductive region, said closed loop including a plate of superconductive material, means for producing a spot of normal conductivity in said plate wherein a magnetic flux passes through the plate, and means for moving said spot and flux across said plate and into said non-superconductive region in a manner such that a continuous superconductive path exists in said closed loop for all positions of the spot in said plate, whereby a persistent circulating current is produced in said closed superconductive loop.

14. A superconductive current generator comprising, a plate of superconductive material, a path of superconductive material extending from said plate and having its two ends joined to said plate at spaced apart points thereon to form a closed superconductive loop therewith which encircles a region of non-superconductive material, means for producing a spot of normal conductivity in said plate wherein a magnetic flux passes through the plate, and means for moving said spot along a given path including a portion of said plate so that said flux passes into said non-superconductive region, the movement of said spot being controlled so that a continuous superconductive path exists in said closed superconductive loop for all positions of the spot in said portion of the plate.

15. Apparatus as described in claim 14 further comprising means for causing said spot to traverse said path one or more times in the same direction to increase the persistent current flowing in said closed loop proportional thereto and to cause said spot to traverse said path one or more times in the opposite direction to decrease or reverse the persistent current flowing in said loop in accordance therewith.

16. Apparatus as described in claim 14 wherein said plate is composed of a relatively soft superconductive material and at least a portion of said path is composed of a relatively hard superconductive material.

17. Apparatus as described in claim 16 wherein said spot moving means comprises a magnet positioned with one pole adjacent to and facing said plate and arranged to move in a first direction which describes said given path and in a second direction opposite thereto.

18. Apparatus as described in claim 14 further comprising means for causing said spot to alternately move back and forth along at least a portion of said given path which includes that portion of the path wherein said magnetic flux passes into said non-superconductive region.

References Cited

Thewlis, Encyclopaedic Dictionary of Physics, Pergamon Press, Washington, D.C., QC5–E6, vol. 4, p. 553, and vol. 7, p. 109.

MILTON O. HIRSHFIELD, *Primary Examiner.*

ORIS L. RADER, *Examiner.*

L. L. SMITH, *Assistant Examiner.*